United States Patent [19]

Ng

[11] Patent Number: 5,528,598
[45] Date of Patent: Jun. 18, 1996

[54] APPARATUS AND METHOD FOR LIMITING JITTER IN A TELECOMMUNICATIONS SIGNAL

[75] Inventor: Tat K. Ng, Derby, Conn.

[73] Assignee: TranSwitch Corporation, Shelton, Conn.

[21] Appl. No.: 253,368

[22] Filed: Jun. 3, 1994

[51] Int. Cl.$^6$ .................................................. H04J 3/07
[52] U.S. Cl. ........................... 370/102.000; 370/105.300; 375/371
[58] Field of Search ........................... 370/110.1, 102, 370/100.1, 105.3, 84; 375/118

[56] References Cited

U.S. PATENT DOCUMENTS

| | | | |
|---|---|---|---|
| 5,014,271 | 5/1991 | Fujimoto et al. | 370/102 |
| 5,131,013 | 7/1992 | Choi | 370/102 |
| 5,210,745 | 5/1993 | Guinand et al. | 370/84.00 |
| 5,287,360 | 2/1994 | Regent | 370/102 |
| 5,331,641 | 7/1994 | Parruck et al. | 370/102 |
| 5,343,476 | 8/1994 | Urbansky | 370/102 |
| 5,361,263 | 11/1994 | Urbansky | 370/102 |

Primary Examiner—Douglas W. Olms
Assistant Examiner—Ajit Patel
Attorney, Agent, or Firm—David P. Gordon

[57] ABSTRACT

In a system where jitter in a first telecommunications signal (e.g., TUG-3) which is being mapped into a second telecommunications signal (e.g., STS-3C) is reduced by moving the TUG-3 pointer in the opposite direction of the pointer movement of the STS-3C signal, and by suspending FIFO measurement from the time of the STS-3C pointer movement until the next TUG-3 stuff or destuff, the improvement is in further limiting jitter by moving the measurement points for the TUG-3 FIFO measurements without conducting TUG-3 pointer movements when the TUG-3 pointer movement would otherwise be moved into or over the transport overhead of the TUG-3 signal. The TUG-3 pointer movement is held in abeyance until two additional pointer movements in the same direction are received, and then the jump is made. During that time however, the measurement points for the TUG-3 FIFO depth measurements are moved by a byte each time the TUG-3 pointer movement is received. After three pointer movements in the same direction, the TUG-3 pointer and the FIFO depth measurement location are again coincident.

18 Claims, 9 Drawing Sheets

POH = PATH OVERHEAD BYTE

: STS-Nc PAYLOAD CAPACITY

: UNDEFINED OVERHEAD BYTE (ALL-ZEROS PATTERN AS AN OBJECTIVE)

\* : CONCATENATION INDICATION
H1\*(10010011)
H2\*(11111111)

APPARATUS AND METHOD FOR LIMITING JITTER IN A TELECOMMUNICATIONS SIGNAL

This application relates to U.S. Ser. Nos. 08/253,382 and 08/253,383 filed of even date herewith, and respectively entitled "Apparatus and Method for Limiting Jitter Caused by Pointer Movement While Mapping One Telecommunications Signal into Another Such Signal" and "Apparatus and Method for Limiting Jitter In a Telecommunication Signal Which is Being Mapped Into Another Such Signal by Temporarily Suspending Measurement of Available Data".

BACKGROUND OF THE INVENTION

1. Field of the Invention

This invention generally relates to telecommunications signals. More particularly, this invention relates to apparatus and methods for limiting jitter in a first telecommunications signal which can be caused by pointer movement in a second telecommunications signal into which the first telecommunications signal is being mapped. The invention finds specific application in the limiting of jitter in a TUG-3 signal caused by a pointer movement in a SONET STM-1 (STS-3) signal, although it is not limited thereto.

2. State of the Art

The telecommunications network servicing the United States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper cable and with lower attenuation.

While fiber optic cable represents the future in telecommunications, presently there remains an entire telecommunications network comprised of various cable types, served by equipment of different vintages, and run according to various coexisting transmission standards. While older standards, cables, and equipment will be eventually phased out, for the time being, it is necessary that all the old and new standards, equipment, and transmission lines be as compatible as possible. Often, such compatibility requires the mapping and multiplexing of a plurality of lower speed signals into higher speed signals and vice versa. Such a mapping with concurrent multiplexing and demultiplexing is common in commonly found add/drop equipment.

When mapping one signal into another signal, it is desirable to limit signal jitter, both because it is advantageous to limit the amount of buffer memory and resultant delay which results from large buffers, and because the standards of various telecommunications signals do not permit large amounts of jitter. In telecommunications signals subject to the SONET standards, jitter can be caused by pointer movements (e.g., pointer increments (INC) and decrements (DEC)) which cause byte stuffing and destuffing. Stuffing (INC) and destuffing (DEC) are legitimate mechanisms which compensate for frequency offset between two signals. When stuffing or destuffing occurs, the SONET payload bytes move relative to the overhead bytes. In order to accommodate stuffing (INC) or destuffing (DEC) in the SONET signal, the telecommunications signals which are being mapped into the SONET signal must either provide additional data (in the case of destuffing in the SONET signal) than would otherwise be provided, or hold data back (in the case of stuffing in the SONET signal) which would otherwise be provided. The provision of additional data, or the holding back of data, however, must be assimilated by the signal being mapped into the SONET signal, e.g., through bit stuffing or destuffing. This assimilation, however, can cause substantial jitter in the signal being mapped, and cause it to fail jitter performance requirements.

SUMMARY OF THE INVENTION

It is therefore an object of the invention to provide a mechanism to limit the jitter of a first telecommunications signal which is being mapped into a second telecommunications signal when the second telecommunications signal requires a pointer increment (byte stuff) or decrement (byte destuff).

It is another object of the invention to utilize pointer movements in a first telecommunications signal which is being mapped into a second telecommunications signal in order to limit jitter when the second telecommunications signal requires a pointer increment or decrement.

It is a further object of the invention to limit jitter in TUG-3 telecommunications signals which are being mapped into a SONET STS-3C signal by causing the pointers of the TUG-3 signal to move in the opposite direction of the pointer movement in the STS-3C signal.

It is an additional object of the invention to limit jitter in TUG-3 telecommunications signals which are being mapped into a SONET STS-3C signal by suspending the measurements of the depth of the TUG-3 FIFOs upon receipt of the SONET pointer movement, and resuming the FIFO depth measurements only after the TUG-3 pointer movement has taken place.

Another object of the invention is to provide a mechanism for reducing jitter in the mapping of a TUG-3 communications signal into a STS-3C signal by moving the measurement points for the TUG-3 FIFO measurements a predetermined number of times without conducting TUG-3 pointer movements when the TUG-3 pointer movement would otherwise be moved over the transport overhead of the TUG-3 signal.

In accord with the objects of the invention, the method invention generally comprises limiting jitter in the mapping of a first telecommunications signal which is being mapped into a second telecommunications signal, by, upon receiving an indication that the payload pointer of the second telecommunications signal is moving in a first direction, generating a compensative payload pointer movement of the first telecommunications signal in a second direction which is opposite the first direction. The method invention has particular application to the mapping of three E3 telecommunications signals which are in the format of a TUG-3 signal into an STS-3C SONET telecommunications signal in the STM-1 VC-4 format. When the STS-3C signal requires a pointer movement due to frequency compensation in the system, a compensative pointer movement at the TUG-3 level avoids up to eight units of jitter in the TUG-3 signal which could adversely affect system performance.

As is known in the art, a FIFO is used to store data bits of the first telecommunications signal which is being mapped into the second telecommunications signal, and the number of bits stored in the FIFO (i.e., FIFO "depth") is used in determining whether to generate a stuff or destuff signal and, in the case of a byte stuff or destuff, an associated pointer movement. Thus, according to another aspect of the invention, jitter in the first telecommunication signal which could result from a pointer movement in the second telecommunications signal, is limited by suspending the FIFO measurement from the time of the pointer movement which would effect stuffing or destuffing in the second telecommunications signal until after the pointer movement and byte stuff or byte destuff in the first telecommunications signal has been accomplished; at which time the FIFO measurement resumes. In the case of the mapping of TUG-3 signals into an STS-3C signal, measurement of the FIFOs stops preferably from the time the byte after the H2 byte of data is received from the STS-3C signal (right after the STS-3C pointer movement is detected) to the time after the next H1, H2, H3, and the byte after the H3 byte of data are written in the TUG-3 signal (after the TUG-3 pointer movement takes place).

According to yet another aspect of the invention, jitter in a TUG-3 telecommunications signal which is being mapped into an STS-3C telecommunications signal is reduced not only by moving the TUG-3 pointer in the opposite direction of the pointer movement of the STS-3C signal, and not only by suspending FIFO measurement from the time of the STS-3C pointer movement until the next TUG-3 stuff or destuff, but by moving the measurement points for the TUG-3 FIFO measurements without conducting TUG-3 pointer movements when the TUG-3 pointer movement would otherwise be moved into or over the transport overhead of the TUG-3 signal. In particular, because the STS-3 pointer movement causes the TUG-3 signal to move in the STM-1 frame, there are situations when the compensating pointer movement in the TUG-3 would cause the POH of the TUG-3 to move onto the TOH of the TUG-3 signal. Since this cannot be allowed, the TUG-3 pointer movement would normally be arranged to jump over the TOH of the TUG-3 signal. However, such a jump would cause additional jitter. Thus, the pointer movement is held in abeyance until two additional pointer movements in the same direction are received, and then the jump is made. During that time however, the measurement points for the TUG-3 FIFO measurements are moved by a byte each time the TUG-3 pointer movement is received. After three pointer movements in the same direction, the TUG-3 pointer and the FIFO measurement location are again coincident.

Apparatus for implementing the methods of the invention are related directly to the methods.

Additional objects and advantages of the invention will become apparent to those skilled in the art upon reference to the detailed description taken in conjunction with the provided figures.

BRIEF DESCRIPTION OF THE DRAWINGS

FIGS. 3a–3l are diagrams showing movement of the TUG-3 transport overhead relative to the TUG-3 POH which results from the STS-3C pointer movement and then the TUG-3 compensating pointer movements.

DETAILED DESCRIPTION OF THE PREFERRED EMBODIMENT

Before turning to detailed aspects of the mechanisms for limiting jitter in a first telecommunications signal which is being mapped into a second telecommunications signal, an overview of the terminology and the format of the telecommunications signals is helpful. It should be appreciated that while the invention is being described with reference to two particular telecommunications signals (TUG-3 and STS-3C), the invention has application to other telecommunications signals which effect pointer movements, stuffs, and destuffs.

Figure 1:
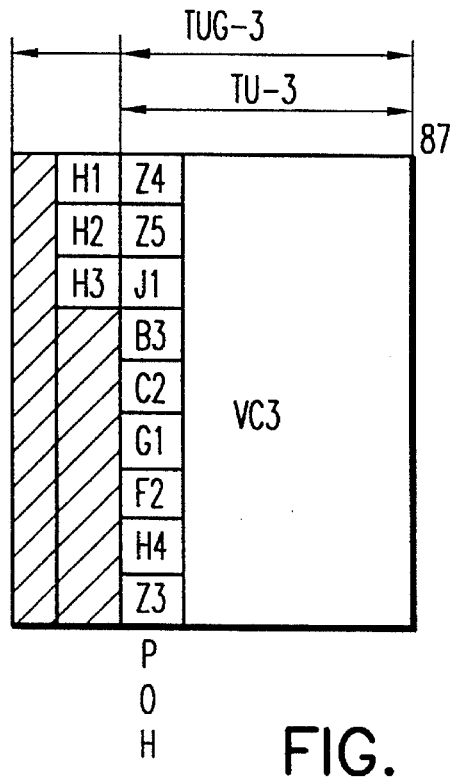
FIG. 1 is a diagram of the frame format of a TUG-3 signal.

FIG. 1 is a diagram of the frame format of a TUG-3 signal. The TUG-3 signal of FIG. 1 has several components: a VC-3 payload; a path overhead (POH); a transport overhead (TOH); and an undefined portion which is shown as cross-hatched. The VC-3 payload is typically generated from an E3 stream of data. The VC-3 payload in conjunction with the path overhead (POH) is said to form a TU-3 signal. The transport overhead includes at least three bytes: H1, H2, and H3. Bytes H1 and H2 together constitute a pointer which points to the start of the payload; i.e., to the J1 byte of the POH. Byte H3 is a "byte destuff" opportunity; i.e., one byte actual payload data may be inserted into byte H3 if necessary. The undefined portion of the TUG-3 signal is provided for purposes of mapping the TUG-3 signal into a telecommunications signal formatted in the SONET format, as discussed below. In particular, if the TUG-3 is to be mapped into the payload of an STS-1 type signal, eighty-seven columns of data are required. Since the typical TUG-3 has only eighty-six columns of data, and the first section of data having the transport overhead only has three bytes of data as opposed to nine bytes of data, one complete "undefined" column and one partial undefined column are required for a proper mapping. Similarly, if the TUG-3 is to be mapped into a portion (e.g., one-third) of the payload of an STS-3C type signal, the TUG-3 similarly needs the eighty-seven columns of data. Hence, the complete and partial undefined columns must be provided. For purposes herein, the first undefined column of the TUG-3 signal will be designated "OH1", while the transport overhead (H1, H2, H3), in conjunction with the partial undefined column will be designated "OH2". For purposes of mapping the TUG-3 into an STS-3C type signal, both of these columns will be said to comprise the transport overhead for the TUG-3 signal.

Figure 1A:
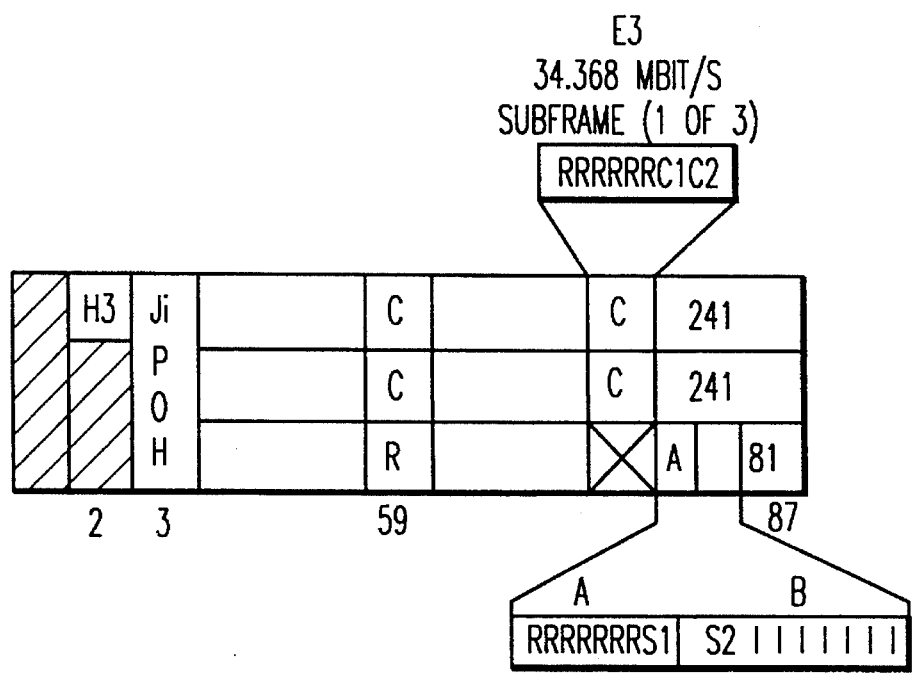
FIG. 1a is a breakout of a portion of FIG. 1 showing bit stuff and bit destuff opportunities in a TUG-3 signal.

Three of the nine rows of the TUG-3 signal of FIG. 1 are seen in FIG. 1a and merit closer analysis. The byte located directly after the H3 byte destuff opportunity represents a "byte stuff" opportunity; i.e., one byte of "stuff" which is not data may take the place of actual data. While in FIG. 1a, the byte after the H3 byte is shown as J1, those skilled in the art will recognize that the TUG-3 payload can slide relative to the TUG-3 frame, and thus the J1 byte will not always follow the H3 byte. In addition to the byte stuff opportunity, two bytes (A, B) with a bit stuff and bit destuff opportunity are provided. Control of bit stuffing or destuffing is exercised by the five stuff/destuff control bytes (C). As shown in the breakout of one of the control bytes, each of the control bytes includes six unused bits (R), and two control bits (C1, C2). As shown in the breakout of bytes A and B, byte A includes seven undefined bits and a destuff bit opportunity (S1), while byte B includes seven bits of data (I) and a stuff bit opportunity (S2). When no bit stuff or destuff is required, the control bytes each set the control bit C1 to a value 0 and the control bit C2 to a value 1. As a result, bit S1 of byte A is caused to be set as an unused bit, while bit S2 is set as a data bit of information. If a bit stuff is desired, the control bits C2 are set to zero so that bit S2 is set as an unused bit; while if a bit destuff is desired, the control bits C1 are set to a value one so that bit S1 is set as a data bit of information. It will be appreciated by those skilled in the art, that in previous TUG-3 applications, it is typically the destuff and stuff bits S1 and S2 which have been utilized for synchronization purposes as opposed to the H3 byte and the byte following H3 which introduce eight bits or units of movement at a time.

Figure 2:
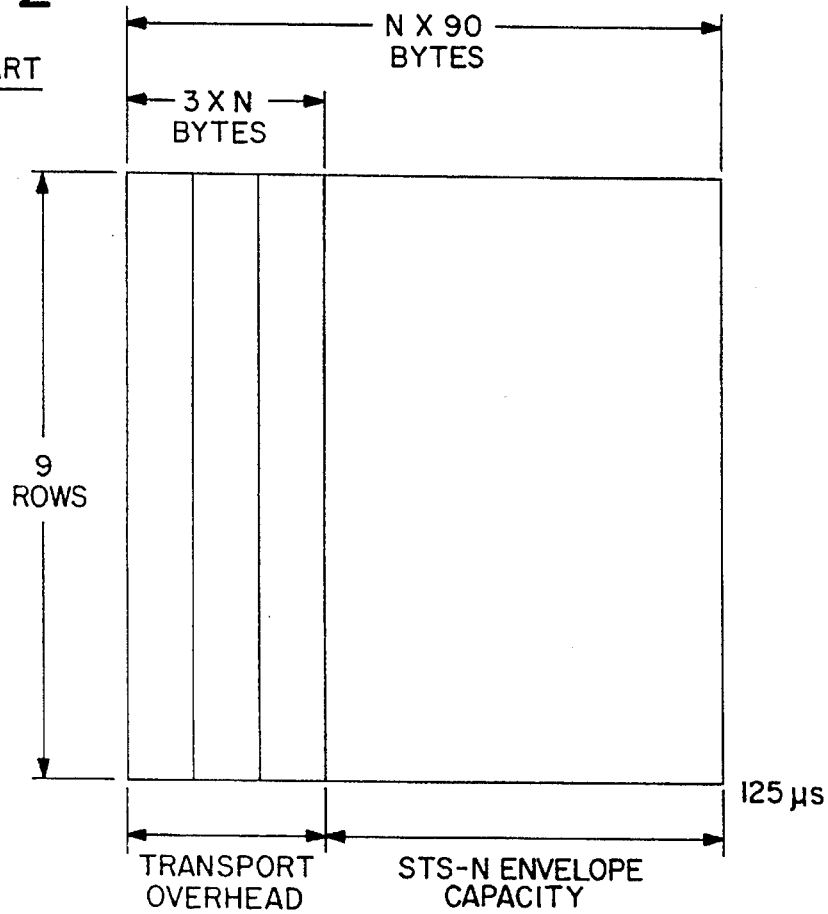
FIG. 2 is a diagram of the frame format of an STS-3C signal.

Before turning to FIG. 2, it should be noted that the three rows of FIG. 1a are substantially repeated three times in the TUG-3 frame, except that the POH bytes change. Thus, in each TUG-3 frame, there are three bit destuff (S1) and three bit stuff (S2) opportunities with associated controls.

Figure 2B:
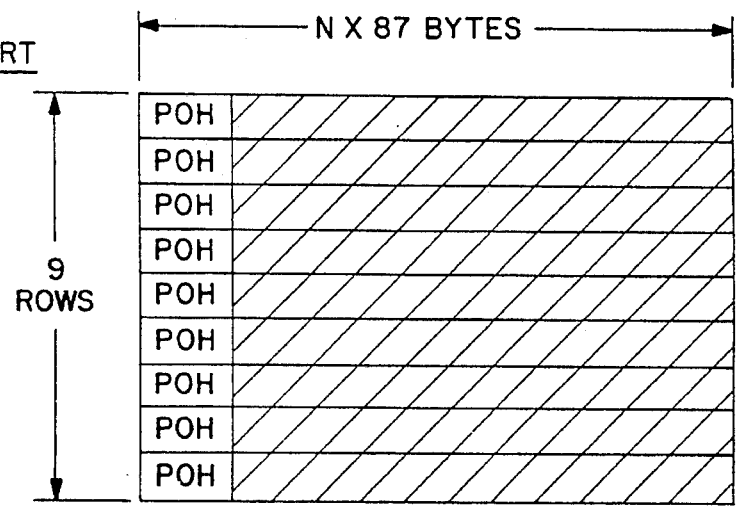
FIGS. 2a and 2b are breakouts of portions of FIG. 2 and show the transport overhead, the path overhead, and the data payload of the STS-3C signal of FIG. 2.
Figure 2B:
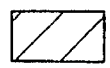
Figure 2A:
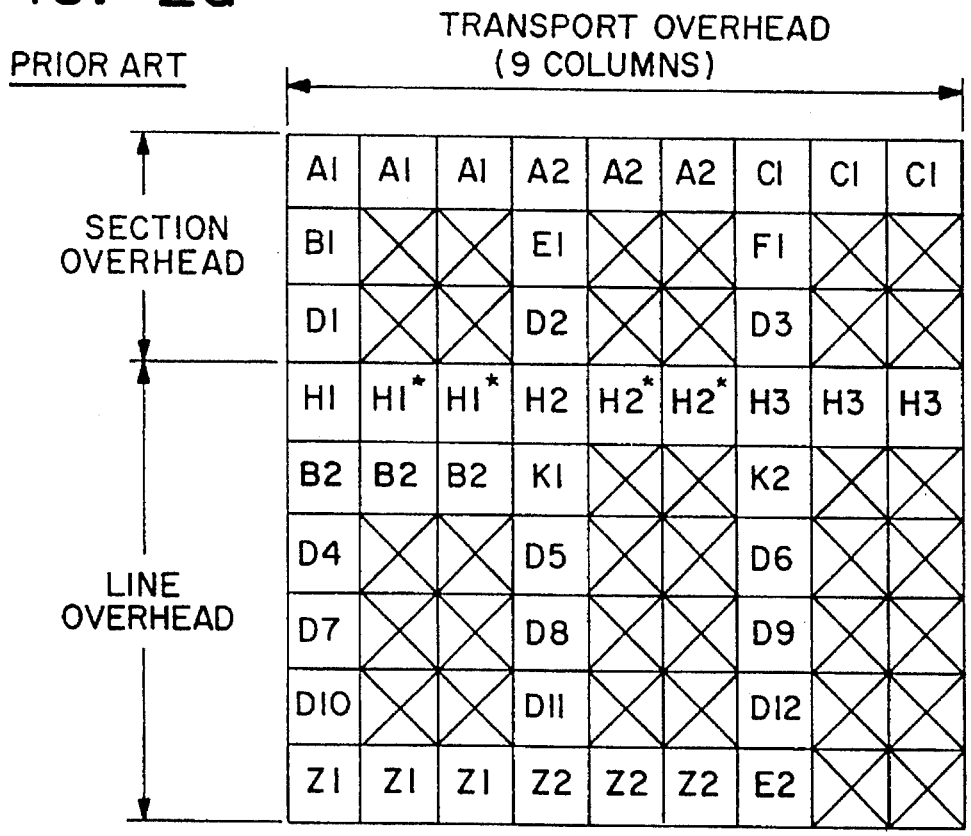
Figure 2A:

Turning to FIG. 2, a diagram of the frame format of an STS-3C signal is seen. The STS-3C signal includes 270 columns, with the first nine columns being reserved for the transport overhead. As seen in FIG. 2a, many bytes of the transport overhead are defined, although some are left undefined. In addition, as seen in FIG. 2b, the payload of the STS-3C signal is shown to include three bytes of path overhead (POH), and an additional two hundred fifty-eight bytes of data payload. As is known to those skilled in the arts, the POH bytes do not have to take the position shown in FIG. 2b, as the POH bytes, as well as the data payload, slide relative to the STS-3C frame.

In a typical add/drop situation, it may be desirable to multiplex a TUG-3 signal such as is seen in FIG. 1 into a portion (e.g., one-third) of an STS-3C signal such as is seen in FIG. 2. In such a situation, when the STS-3C signal generates a pointer movement which requires a byte stuff or byte destuff, the TUG-3 signal must immediately provide the stuff or data required. The immediate provision of stuff or data will typically cause the TUG-3 signal to experience jitter, as the amount of buffered data awaiting mapping into the STS-3C will increase by eight bits if stuff was provided instead of data, or will decrease by eight if data (destuff) was provided instead of stuff. The bit stuffing or destuffing mechanisms (S1 and S2) can then be used over .time to increase or decrease the amount of buffered data awaiting mapping to the ideal amount so as to prevent underflow or overflow of data. However, such a corrective bit stuffing or destuffing mechanism could take numerous frames to accomplish, as due to standards requirements, a bit stuffing or destuffing is only permitted once every so many frames in order to maintain the jitter performance.

In accord with a first aspect of the invention, in order to eliminate the problems introduced into the TUG-3 signal as a result of a stuff or destuff requirement in the STS-3C signal, upon a pointer movement associated with the stuff or destuff in the STS-3C signal, the TUG-3 signal generates a compensative payload pointer movement in the opposite direction of the pointer movement in the STS-3C signal. For example, if the STS-3C signal requires a destuff (i.e., additional data), the TUG-3 signal must immediately provide that data for the H3 byte of the STS-3C signal. Upon providing extra data, the amount of buffered data for the TUG-3 signal will decrease by one byte. In order to increase the amount of data in the data buffer back to the ideal level, a stuff signal is generated in the TUG-3 signal. As a result of the stuff signal, at the byte after the H3 byte of the TUG-3 signal, stuff will be inserted into the TUG-3 data stream. When the stuff is sent to the STS-3C signal in lieu of actual data, the amount of buffered data for the TUG-3 signal will increase by one byte back to the ideal level.

The apparatus for implementing the compensative payload pointer movement is seen and will be discussed below with reference to FIG. 4.

In accord with a further aspect of the invention, jitter in a first telecommunication signal (e.g., TUG-3) which could result from a pointer movement in the second telecommunications signal (e.g., STS-3C) is limited by temporarily suspending buffer depth measurements. As is known in the art, a FIFO is often used to store bits of a telecommunications signal which is being mapped into another telecommunications signal. Indeed, as disclosed in co-owned U.S. Pat. No. 5,141,529 to Parruck et al., and U.S. Pat. No. 5,157,655 to Hamlin et al., the depth of the FIFO (i.e., the amount of data buffered) can be used to determine whether to generate a stuff or destuff signal and provide an associated pointer movement. According to this invention, the FIFO depth measurement is suspended preferably from the time of the stuffing or destuffing occurrence in the second telecommunications signal (STS-3C) until after the pointer movement and stuff or destuff in the first telecommunications signal (TUG-3) has been accomplished. In particular, in the case of the mapping of TUG-3 signals into an STS-3C signal, measurement of the FIFOs preferably stops immediately after an STS pointer movement is detected (although the measurement can be stopped at any time prior to the next depth measurement location). Immediate stoppage may be accomplished in several ways. In a first embodiment, the STS-3C H1 H2 value for the pointer is checked to determine whether a pointer INC or DEC is being accomplished, and if so, the FIFO measurements are stopped immediately. In a second embodiment, the STS-3C H3 byte and the byte after the H3 byte are monitored. If the H3 byte is used for signal data, as in the case of destuffing, the FIFO measurements are stopped. Likewise, if the data byte after the H3 signal is used for stuff as opposed to signal data, as in the case of stuffing, the FIFO measurements are stopped. It will be appreciated that if an SPE control signal is available, the SPE control signal can be used in a third embodiment, in conjunction with the H3 byte and the byte after the H3 byte, to determine whether a stuff or destuff is being accomplished, and in order to stop the FIFO measurement. Regardless of how accomplished, the FIFO depth measurement is stopped preferably until the next H1, H2, H3, and in the case of a stuff, the byte after the H3 byte of data are written in the TUG-3 signal. All of the TUG-3 H1, H2, H3 bytes, and in the case of a stuff, the byte after the H3 signal, must be written into the TUG-3 signal before resuming FIFO measurement, because it is possible that the H1 or H2 bytes of the TUG-3 signal are being written into the SONET payload at the time the STS-3C H3 byte or the byte after the STS-3C H3 byte received are being indicated as an STS stuff or destuff. In such a case, the TUG-3 signal would not have had time to change the TUG-3 H1 H2 pointer to effect a TUG-3 byte stuff or byte destuff.

The suspension of the FIFO depth measurement from the time of stuffing or destuffing in the STS-3C signal until the time of destuffing or stuffing in the TUG-3 signal reduces jitter in the TUG-3 signal, as upon an STS-3C signal stuffing, the TUG-3 signal FIFO depth measurement would increase, or upon an STS-3C signal destuffing, the TUG-3 signal FIFO depth measurement would decrease. Of course, the increase or decrease would be cancelled out by the compensative pointer movement described above. However, in the mean time, it is possible that as a result of the shortfall of data or the excess of data measured in the FIFO, the control bytes of the TUG-3 signal would be arranged to cause a bit stuff or destuff in the A or B bytes of TUG-3 signal. After the compensative pointer movement, the opposite bit destuff or stuff would then often occur, i.e., the data stream would be jittered. It should be noted that while the FIFO depth measurements are being suspended, default values 0 and 1 are respectively used for the C1 and C2 bits in order to guarantee that no bit stuffs or destuffs occur during this time.

The apparatus implementing the method of suspending the FIFO measurement is seen, and will likewise be discussed below with reference to FIG. 4.

According to yet another aspect of the invention, jitter in a TUG-3 telecommunications signal which is being mapped into an STS-3C telecommunications signal is further reduced by moving the measurement points for the TUG-3 FIFO depth measurements without conducting TUG-3 pointer movements when the TUG-3 pointer movement would otherwise be moved into or over the transport overhead of the TUG-3 signal. In particular, because the STS-3 pointer movement causes the TUG-3 signal to move in the STM-1 frame, and because the TUG-3 path overhead and data can move relative to the transport overhead of the TUG-3 frame, there are situations, as set forth in more detail below, when the compensating pointer movement in the TUG-3 would cause the POH of the TUG-3 to move onto the TOH of the TUG-3 signal. Since this cannot be allowed, the TUG-3 pointer movement would normally be arranged to lump over the TOH of the TUG-3 signal. However, if the FIFO depth measurement is tied to a byte or bytes of the TUG-3 POH (as is the case in the preferred embodiment of the invention) such a jump would cause additional jitter as two more (or fewer) bytes would be collected in the FIFO. Thus, according to the invention, the pointer movement is preferably held in abeyance until two additional pointer movements in the same direction are received, and then the jump is made. During that time however, the measurement point for the TUG-3 FIFO depth measurements is moved by a byte each time the STS-3C pointer movement is received. This movement of the measurement point accomplishes the same results of the compensative pointer movement discussed above, by eliminating the jitter which would occur due to the addition or subtraction of bits of data from the TUG-3 FIFO. Regardless, after three STS-3C pointer movements in the same direction, the TUG-3 pointer is adjusted by three bytes, and the TUG-3 pointer and FIFO depth measurement locations are again coincident.

As suggested above, FIFO depth measurements upon which bit stuff and destuff determinations are made in the TUG-3 signal are tied to certain TUG-3 POH bytes. Preferably, the FIFO depth measurements are made at the J1, G1, and Z3 bytes (see FIG. 1) of the TUG-3 frame, as this permits the control signals (C) to be generated properly so that bit destuffs (S1) and bit stuffs (S2) can be made promptly (i.e., waiting time jitter is reduced).

With the FIFO depth measurement being tied to a byte of the payload of the TUG-3 frame, a byte stuff or destuff in the TUG-3 frame could cause the POH of the TUG-3 signal to jump over the TOH (columns OH0 and OH1) of the TUG-3 signal. This would result in the FIFO depth measurement being made three bytes earlier or later rather than one byte earlier or later. In order to eliminate the jitter this would cause, as set forth above, the measurement point for the TUG-3 FIFO depth measurements is moved by a byte (i.e., one STS clock period) each time the STS-3C pointer movement is received, but the pointer movement is held in abeyance until two additional pointer movements in the same direction are received, and then the jump is made. Thus, the FIFO depth measurement point is temporarily disassociated from the J1, G1, and Z3 bytes.

Figures 3A, 3B, 3C, 3D, 3E, 3F, 3G, 3H:
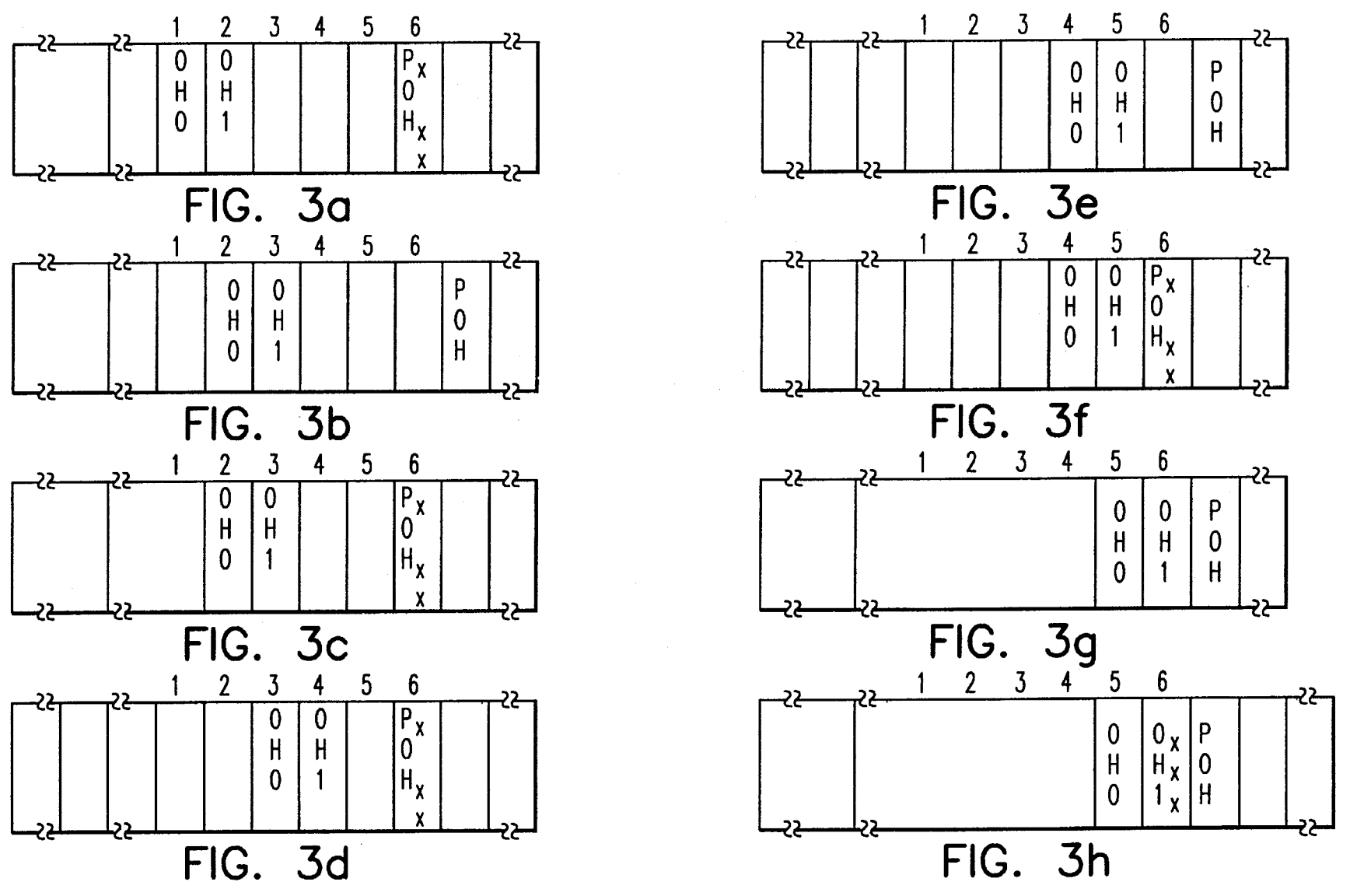

FIGS. 3a–3l are diagrams which show movement of the TUG-3 transport overhead relative to the TUG-3 POH which results from the STS-3C pointer movement and additional movement resulting from the TUG-3 compensating pointer movements. In FIGS. 3a–3l, the stuff and transport overhead of the TUG-3 signal are shown as columns OH0 and OH1, while the TUG-3 path overhead is shown as POH. FIFO depth measurement locations are denoted with an "x" in the TUG-3 POH. As seen in the hypothetical starting point FIG. 3a, the POH of the TUG-3 signal is several columns away from the TUG-3 transport overhead. It will be appreciated that a stuff requirement in the STS-3C signal will cause the bytes of the STS-3C payload envelope of the STS-3C signal to move towards the right as shown in FIG. 3b. A compensating destuff in the TUG-3 signal, however, causes the POH of the TUG-3 signal to move to the left relative to the TOH of the TUG-3 signal as seen in FIG. 3c. Effectively, then, a stuff or destuff requirement in the STS-3C signal which is followed by a corrective pointer movement in the TUG-3 signal causes the TOH of the TUG-3 signal to move, while the POH of the TUG-3 signal moves with the TOH and then moves back to its original location.

After a certain number of STS-3C stuffs, eventually the situation will arise, as seen in FIG. 3d, that the TOH and POH of the TUG-3 signal approach each other. Another STS-3C stuff will again move the entire TUG-3 signal in one direction (compare FIG. 3e with FIG. 3d), while the compensating TUG-3 destuff causes the POH to move in the other direction relative to the TUG-3 frame as seen in FIG. 3f. At this point, the TUG-3 POH is adjacent the TUG-3 TOH. Upon the next STS-3C stuff, as seen in FIG. 3g, the entire TUG-3 signal moves to the right. However, a compensating or correcting TUG-3 destuff would cause the POH to move onto column OH2 of the TUG-3 signal. Since this cannot be allowed, the TUG-3 pointer movement would normally be arranged to jump over the TOH of the TUG-3 signal. However, as discussed above, since the FIFO depth measurement is tied preferably to the J1, G1, and Z3 bytes of the TUG-3 POH, such a jump would cause jitter as fewer bits would be collected in the FIFO than if the POH moved only one byte to the left. Thus, according to the invention, the pointer decrement movement is preferably held in abeyance (i.e., decrement pause phase) until two additional pointer movements in the same direction are received, and then the jump is made. However, as seen in FIG. 3h, the measurement point(s) for the TUG-3 FIFO depth measurements are moved by one byte (onto H3 and two other bytes of OH1) to compensate for the STS-3C stuff.

Figures 3I, 3J, 3K, 3L:
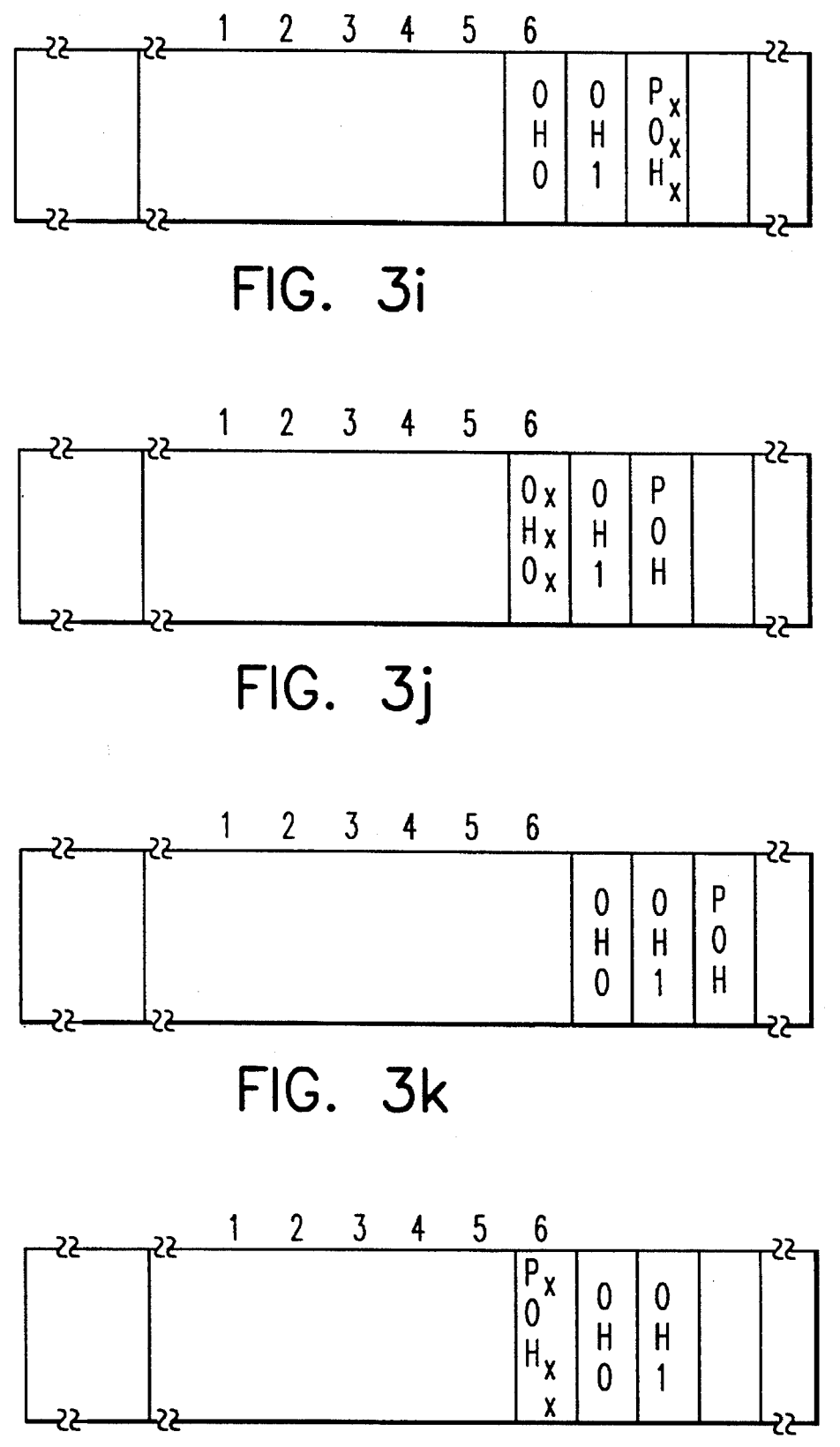

Continuing in this manner, upon the next STS-3C stuff, the entire TUG-3 signal again moves as shown in FIG. 3i.

Again, according to the invention, and as seen in FIG. 3j, the measurement points for the TUG-3 FIFO depth measurements are moved (onto OH0) while the pointer movement increment is held in abeyance. Finally, upon the next STS-3C stuff, the entire TUG-3 signal is moved as shown in FIG. 3k. However, this time, when it is time for the compensative pointer movement of the TUG-3 signal, the POH of the TUG-3 signal is moved three columns (i.e., over the TOH), and as seen in FIG. 3l, the FIFO depth measurement location is again united with the TUG-3 POH J1, G1, and Z3 bytes. It will be appreciated that if pointer movements continue in the direction shown in FIGS. 3a–3l, eventually, the same situation will arise. It will also be appreciated that the equivalent situation could arise in the opposite direction where the STS-3C signal experiences a series of destuffs, and where the TUG-3s compensate with a series of byte stuffs. Further, it will be appreciated that in the case of the STS-3C signal experiencing both stuffs and destuffs, it could take many more than three pointer movements in the STS-3C signal before the FIFO measurement location reunites with the TUG-3 POH bytes.

Figure 4A:
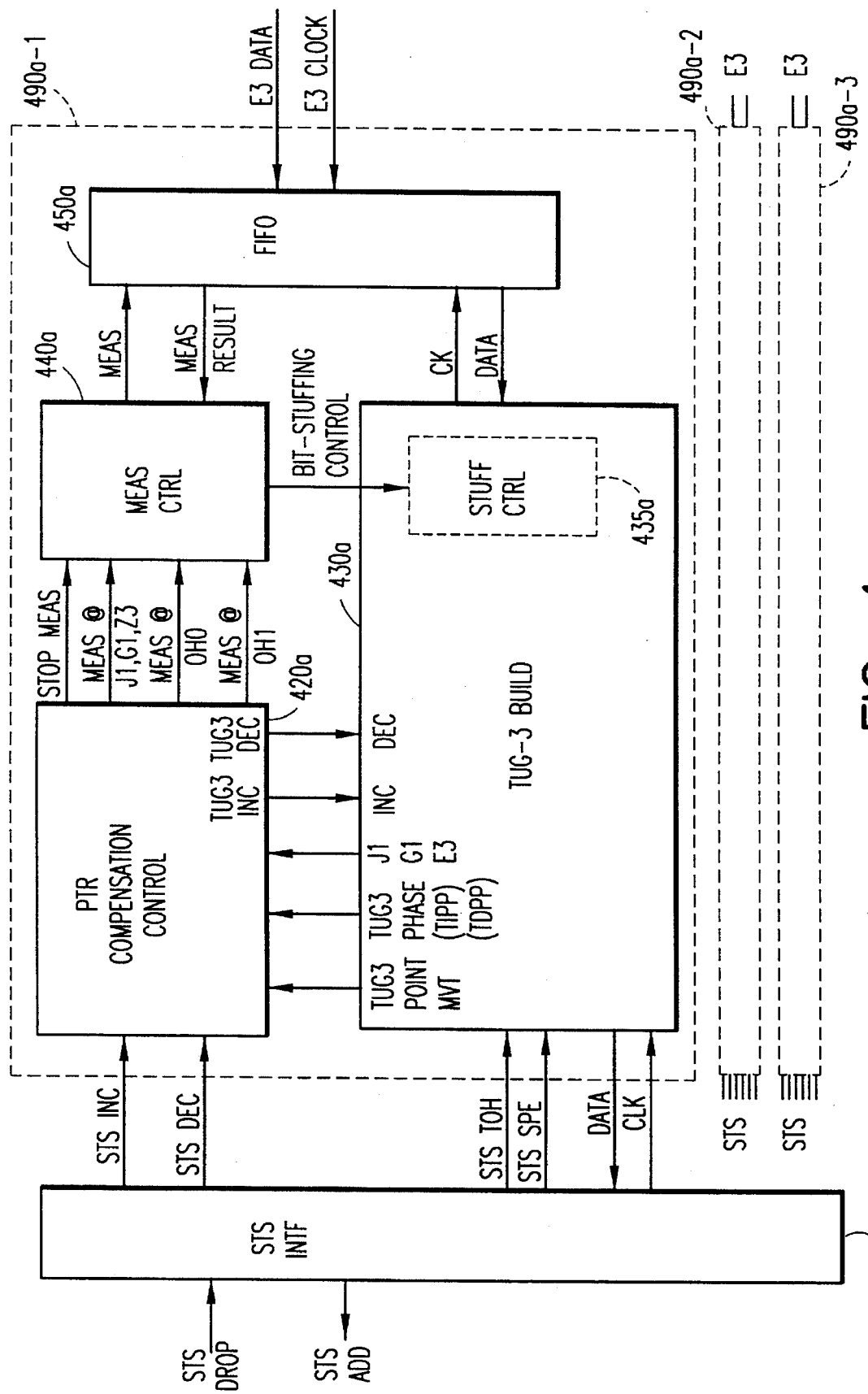
FIG. 4a is a block diagram of the apparatus implementing the methods of generating a compensative payload pointer movement in the TUG-3 signal when the STS-3C signal generates a pointer movement, of suspending the FIFO measurement from the time of the stuffing or destuffing occurrence in the STS-3C until after the pointer movement and byte stuff or byte destuff in the TUG-3 signal has been accomplished, and of moving the FIFO measurement point without doing the pointer movement where a pointer movement will cause the POH to be moved over the TOH.

The apparatus implementing the methods of the invention is seen in FIG. 4a, and generally comprises a STS interface block 410a, a pointer compensation control block 420a, a TUG3 build block 430a, a FIFO measurement control block 440a, and a FIFO 450a. It will be appreciated that all blocks shown in FIG. 4a may be implemented on one or more integrated circuits. It will also be appreciated that for a single STS interface block 410a, three sets of pointer compensation control blocks 420a, TUG3 build blocks 430a, FIFO measurement control blocks 440a, and FIFOs 450a are utilized (indicated as 490-a1, 490a-2, 490a-3), as three TUG-3 signals are required to build a STS-3C signal.

On a very basic level, the method of generating a compensative payload pointer movement is carried out using the STS interface block 410a, the pointer compensation control block 420a and the TUG-3 build block 430a of FIG. 4a. In particular, the STS interface block 410a interfaces with the SONET signal. Among other things, the STS interface block 410a monitors the H1 and H2 bytes of the SONET signal and determines when the pointer has been incremented or decremented in order to generate a stuff or destuff. Upon detection of a pointer movement, the STS interface block 410a appropriate generates and provides the pointer compensation control block 420a with either an increment (STS INC) signal or a decrement (STS DEC) signal. According to the first aspect of the invention, the pointer compensation control 420a generates and provides to the TUG3 build block 430a a TUG-3 decrement (TUG3 DEC) signal in response to the incoming STS INC signal, and a TUG-3 increment (TUG3 INC) signal in response to the incoming STS DEC signal. As will be appreciated by those skilled in the art, the TUG3 build block 430a uses the TUG3 INC or TUG3 DEC control signals in building the TUG-3 signal and adding it to the SONET signal via the STS interface 410a.

The method of the invention which involves suspending the FIFO depth measurement is also implemented in the apparatus of FIG. 4a. In particular, the pointer compensation control block 420a preferably provides at least two control signals to the measurement control block 440a: a stop measurement (STOP MEAS) control; and a measure at bytes J1, G1, and Z3 control. When an STS INC or STS DEC control signal is received by the pointer compensation control block 420a from the STS interface 410a, the pointer compensation control block 420a generates a stop measurement (STOP MEAS) control signal which is fed to the measurement control block 440a. As a result of the stop measurement control signal, the measurement control stops measuring the depth of FIFO 450a. According to the broad concepts of the invention, the stop measurement control remains in effect until the pointer compensation control block 420a provides the TUG3 build block 430a with a TUG3 INC or TUG3 DEC control signal, and the TUG3 build block 430a provides the pointer compensation control with an indication (TUG3 Point Mvt) that it has finished a compensation pointer movement. After that point in time, at the next J1 or G1 or Z3 byte (as indicated to the pointer compensation control block 420a by the TUG3 build block 430a), the stop measurement control is released and FIFO depth measurement continues. As will be appreciated, depending upon the state of the FIFO, a full or empty control signal can be generated to cause the measurement control 440a to generate a bit stuff or bit destuff control signal to the stuff control block (STUFF CTRL) 435a of the TUG3 build block 430a. In turn, the TUG3 build block 430a causes either one bit of data from the FIFO 450a or one bit of stuff (generated by the TUG3 build block) to be inserted into the TUG-3 signal. In lieu of a full or empty control signal, the measurement control 440 can obtain an actual FIFO depth value (either in whole or fractional numbers), and make a full or empty determination from the value.

The method of the invention which involves moving the FIFO measurement point without moving the pointer itself where a pointer movement will cause the TUG-3 POH to be moved over the TUG-3 TOH is also implemented in FIG. 4a. In particular, the phase of the TUG-3 signal (i.e., the relative location of the TOH and POH) is monitored by the TUG-3 build block 430a and provided to the pointer compensation control block 420a as signals TUG3 PHASE. As a result, instead of issuing a TUG3 INC or TUG3 DEC control signal immediately upon receiving the STS DEC or STS INC control, the pointer compensation control block 420a first determines whether such a control signal would cause the TUG-3 POH to jump over the TUG-3 TOH. If so, instead of issuing the TUG3 INC or TUG3 DEC, the pointer compensation control block 420a holds such a pointer compensation control in abeyance. Then, the pointer compensation control block 420a generates the appropriate measure at OH0 or measure at OH1 control signal to the measurement control block 440a.

It will be appreciated that the various other signals are passed between the blocks shown in FIG. 4a. For example, the TUG3 build block 430a is preferably provided with indications of the STS phase via the STS TOH and STS SPE signals provided by the STS interface block 410a.

As an alternative to the suspension of the FIFO depth measurement between the occurrence of the STS pointer movement and the TUG-3 pointer movement in the opposite direction, a compensating offset value may be added to or subtracted from the value of the measurement. In particular, as suggested by FIG. 4b which has the same general blocks as FIG. 4a, instead of the pointer compensation control block 420a (of FIG. 4a) sending a stop measurement control to the measurement control block 440a, the pointer compensation control block 420b (of FIG. 4b) sends an offset value to the measurement control block 440b. The offset value is sent any time upon or after the STS increment or decrement signal is received by the pointer compensation control 420b and before or at the time the measurement is to be made (e.g., when any of the J1, G1, or E3 byte signals is received from the TUG3 build block 430b). Where an STS decrement signal is indicated, the offset signal adds depth to the FIFO depth measurement (i.e., indicates that the FIFO has more data than it actually has) until the TUG3 pointer movement signal is received. This prevents the measurement control block 440b from providing a temporary indication to the stuff control block 435b that the FIFO is emptying which might cause the stuff control block 435b to cause a bit stuff to occur. Likewise, when an STS increment signal is received, the offset signal subtracts depth from the FIFO depth measurement, (i.e., indicates that the FIFO has less data than it actually has) until the TUG3 pointer movement signal is received. This prevents the measurement control block 440b from providing a temporary indication to the stuff control block 435b that the FIFO is filling which might cause the stuff control block 435b to cause a bit destuff to occur. The value of the offset signal is preferably equal to ±(3 STS-3 clock periods/E3 clock period). Where fractional FIFO depth measurements are made, a fractional value for the offset is preferably provided. However, where the FIFO depth measurement is made in whole numbers, the offset value for the STS-3C and E3 for each of the three FIFOs is preferably rounded to the closest integer value; i.e. ±5 bits.

Figure 4B:
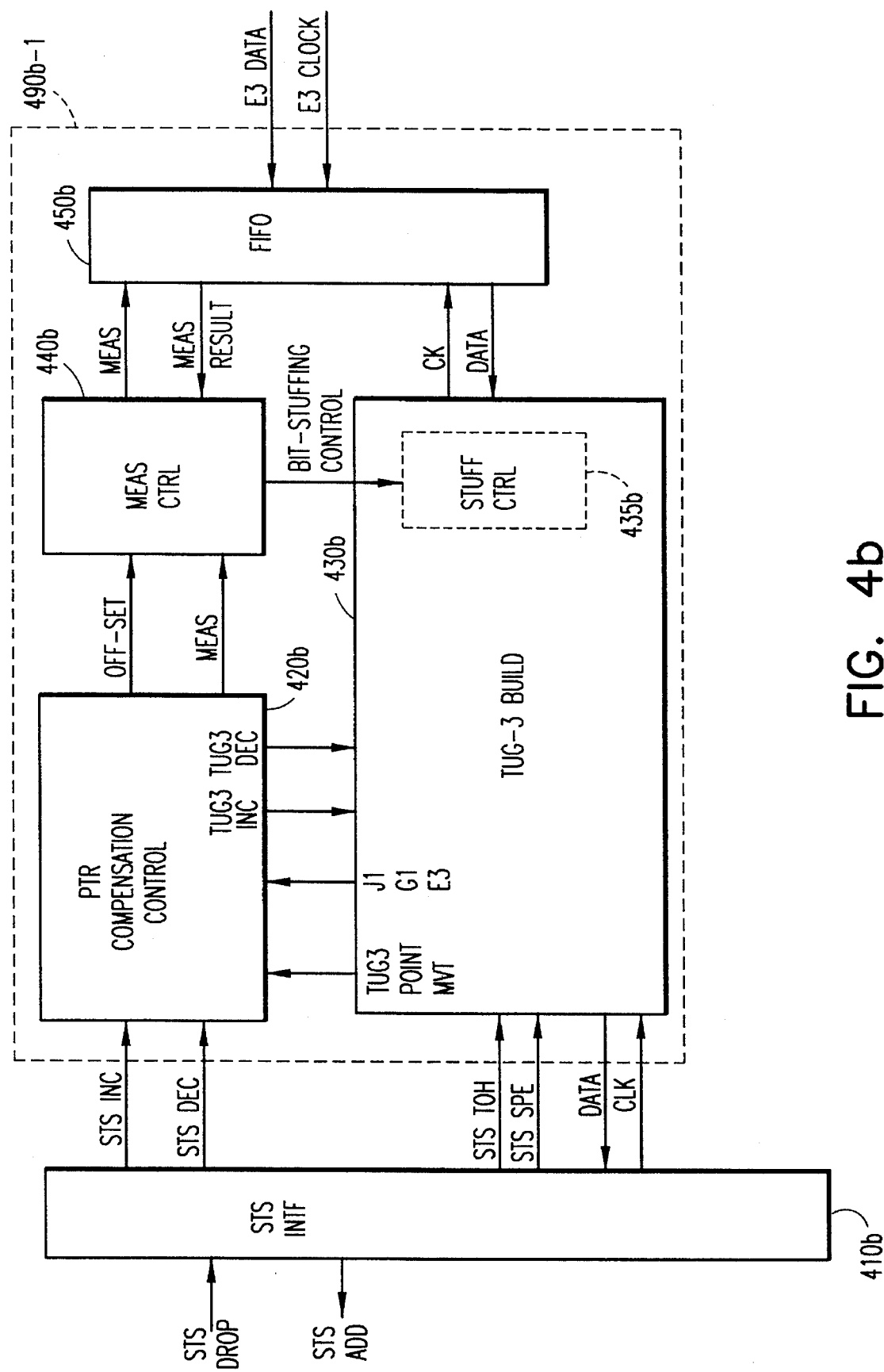
FIG. 4b is a block diagram showing an alternative arrangement for limiting jitter by causing an offset to be added or subtracted to the FIFO depth measurement after the STS pointer movement and before the TUG-3 pointer movement.

It should be appreciated that the apparatus of FIG. 4b can also implement the method of the invention which involves moving the FIFO measurement point without moving the pointer itself where a pointer movement will cause the TUG-3 POH to be moved over the TUG-3 TOH. However, for simplicity, the control signals to implement that method have been deleted from FIG. 4b.

Figure 5A:
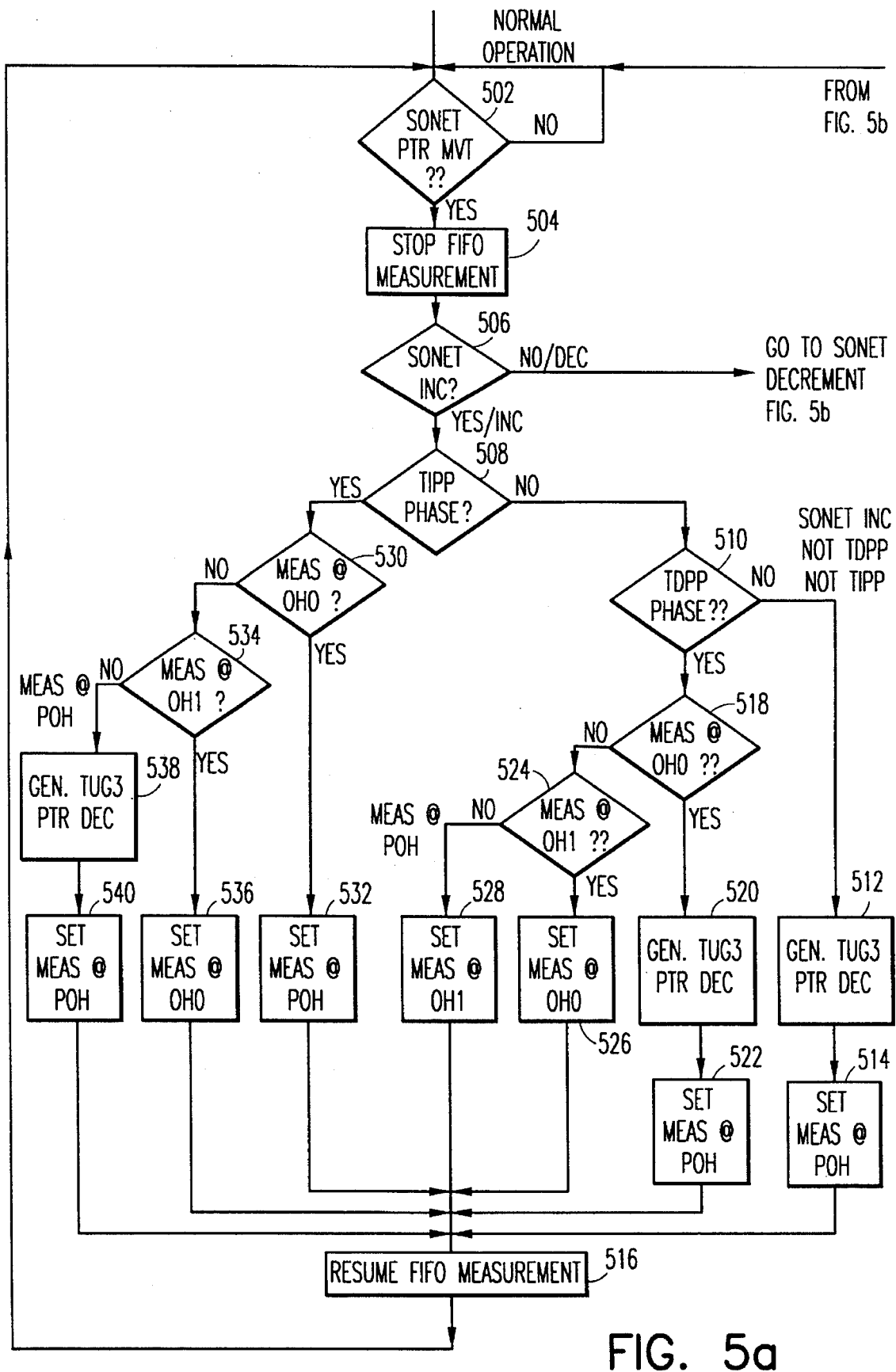
FIGS. 5a and 5b together form a flow diagram of the pointer compensation control block of FIG. 4a which helps implement the methods of the invention.
Figure 5B:
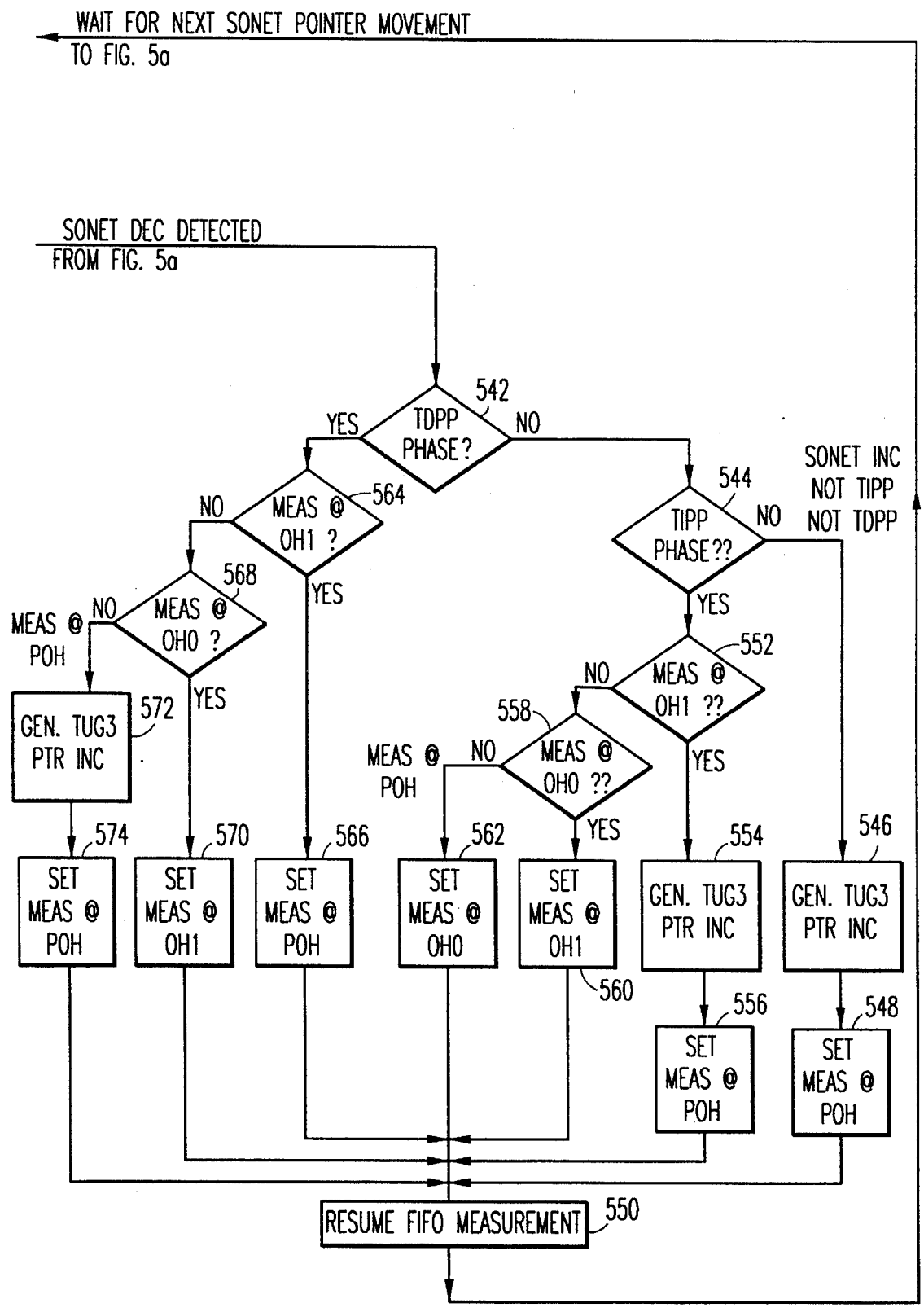

FIGS. 5a and 5b together form a flow diagram for the pointer compensation control block 420a of FIG. 4a which helps implement the method inventions including the compensative payload pointer movement, the preferred method of suspending of the FIFO measurement, and the FIFO point of measurement movement without the TUG-3 pointer movement. Under normal operation, and as seen in FIG. 5a, a determination is made at 502 as to whether the SONET signal has had a pointer movement; i.e., whether a stuff or destuff will be required. If not, the operation recycles and keeps looking for the SONET pointer movement. If a pointer movement is detected, the FIFO depth measurement is stopped at 504. Then, according to the invention, a determination is made at 506 as to whether the SONET pointer movement is indicative of a increment (stuff) or decrement (destuff). If a SONET decrement is indicated, the method continues as will be discussed below with reference to FIG. 5b. Otherwise, the method continues with a determination at 508 as to whether the system is presently within a TUG-3 increment pause phase (TIPP); i.e., whether the FIFO depth measurement location has been disassociated from the POH location due to the movement of the TUG-3 POH over the TUG-3 TOH in the manner opposite to that described above with reference to FIGS. 3g–l. If not, a determination is made at 510 as to whether the system is presently within a TUG-3 decrement pause phase (TDPP); i.e., whether the FIFO depth measurement location has been disassociated from the POH location due to the movement of the TUG-3 POH over the TUG-3 TOH in the manner described above with reference to FIGS. 3g–l. If not, a TUG-3 pointer decrement is generated at 512, and at 514, the measurement point is moved along with the POH. The method then continues at 516 with the resuming of FIFO measurements.

If there was a determination at 510 that the system is presently within a TUG-3 decrement pause phase, a determination is made at 518 as to whether the FIFO depth measurements are presently being made during the OH0 column of the TUG-3 TOH. If the FIFO depth measurements are presently made at OH0, the TUG-3 pointer decrement is generated at 520, and at 522, the measurement point is moved to (reunited with) the POH location. The method then continues at 516 with the resuming of FIFO depth measurements. On the other hand, if the FIFO depth measurements are not being made at OH0, at 524, a determination is made as to whether the FIFO depth measurements are being made at the OH1 column or at the POH column location. If at the OH1 column location, at 526, the FIFO depth measurement location is moved to the OH0 column location, but the pointer is not decremented. If at the POH column location, at 528, the FIFO depth measurement location is moved to the OH1 column location and the pointer is likewise not decremented. In both cases, the system continues by resuming FIFO depth measurements at 516.

If the system was presently within a TUG-3 increment phase as determined at 508, a determination is made at at 530 as to whether the FIFO depth measurements were being made at the OH0 column. If yes, no pointer movement is necessary (as no pointer movement was made when the measurement started to be made at the OH0 column), but at 532, the measurement location is set to the POH column, and the system continues at 516. If, as determined at 534, the FIFO depth measurements were being made at the OH1 column, the measurement location is set to the OH0 column at 536 and the system continues at 516 without pointer movement. Furthermore, if the FIFO depth measurements were being made at the POH column, then a TUG-3 pointer decrement is generated at 538, and the measurement point is reunited with the POH at 540 prior to the resumption of FIFO depth measurements at 516.

Returning to the determination made at 506, if the SONET pointer is a decrement (destuff) as opposed to an increment, the method continues at 542 of FIG. 5b where a determination is made as to whether the system is presently within a TUG-3 decrement pause phase. If not, at 544, a determination is made as to whether the system is presently within a TUG-3 increment pause phase. If not, the SONET decrement is compensated by the generation at 546 of the TUG-3 pointer increment, and at 548, the FIFO measurement location is continued with the POH bytes. The method then continues with the resumption of FIFO depth measurements at 550 and a return to the looking for a SONET pointer movement at 502. If the system is presently within a TUG-3 increment pause phase as determined at 544, then at 552 a determination is made as to whether the FIFO measurement is being made at column OH1 of the TUG-3 TOH. If yes, at 554, a TUG-3 pointer increment is generated, and the FIFO measurement location is set (reunited) at 556 to be at the predetermined POH bytes. On the other hand, if the FIFO measurement is presently being made at column OH0 as determined at 558, then at 560 the FIFO measurement location is moved to column OH1 and no pointer movement is generated. Further, if the FIFO measurement location is presently being made in the POH, at 562, the measurement location is moved to OH0 (disassociating the measurement location from the POH), and again, no pointer movement is generated. Regardless, after the pointer movement is set at 560 or 562, FIFO measurement resumes at 550, and the method continues at step 502.

Where there is a SONET decrement detected, and the TUG-3 signal is in a decrement pause phase, then at 564, a determination is made as to whether the FIFO measurement is being made at the OH1 column of the TUG-3 TOH. If so, at 566 the FIFO measurement is moved back to the POH, and the method continues by resuming FIFO depth measurements at 550. If the FIFO depth measurements are being made at column OH0 as determined at 568, then at 570, the FIFO measurement location is moved to column OH1 prior to resumption of FIFO measurement. Also, if the FIFO depth measurements were being made at the POH column, a TUG-3 pointer increment is generated at 572, and the FIFO depth measurement continues with the POH as indicated at 574 prior to resumption of the FIFO measurement at 550. It will be appreciated that the FIFO measurement is only made after the next H1, H2, H3, and the byte after the H3 byte of data are written in the TUG-3 signal.

There have been illustrated and described herein apparatus and methods for limiting the jitter of a first telecommunications signal which is being mapped into a second telecommunications signal which results from a pointer movement in the second telecommunications signal. While particular embodiments of the invention have been described, it is not intended that the invention be limited thereto, as it is intended that the invention be as broad in scope as the art will allow and that the specification be read likewise. Thus, while the invention was described with particular reference to STS-3C and TUG-3 type signals, it will be appreciated that the invention also applies to other telecommunications signals which have stuff and destuff opportunities and where the payload envelope of the signal can slide relative to the transport overhead of the signal. Also, while block diagrams were provided for implementing the methods of: 1) generating a compensating pointer; 2) suspending FIFO depth measurements between the pointer movement of the second telecommunications signal (STS-3C) and the pointer movement (or measurement location movement of the first telecommunications signal (TUG-3); and 3) temporarily disassociating the FIFO measurement location from the POH of the first telecommunications signal when the pointer movement would cause the POH to jump over the TOH, it will be appreciated that other means could be utilized to implement the methods. For example, while the block diagrams envision the use of a FIFO for depth measurement, it will be appreciated that a RAM or other storage device could be used for that purpose. Furthermore, while particular POH bytes were described as being the preferred times for making FIFO depth measurements, it will be appreciated that FIFO depth measurements could be made at other bytes of TUG-3 frame which are located in either the POH or other data bytes. Also, while the invention was described as suspending FIFO depth measurements between the pointer movement of the STS-3C signal and the pointer movement of the TUG-3 signal, it will be appreciated that FIFO depth measurements could be continued but ignored, and for purposes herein such a situation should be considered a "suspension" of the FIFO depth measurement. Likewise, the depth measurements can be suspended some time after the STS-3C pointer movement provided the next FIFO depth measurement has not yet been made. Further, while the invention was described as suspending pointer movement for two decrements or increments in the same direction before carrying out the pointer movement and permitting the POH to jump the TOH, it will be appreciated that in other applications or situations, the pointer movement could be suspended for a different number of decrements or increments. It will also be appreciated that the pointer movement could be made at the first point in time, with the pointer movement being thereafter suspended until two additional movements in the same direction are received; provided, of course, that the FIFO depth measurement location would move one byte at a time in conjunction with the decrements or increments received. It will therefore be appreciated by those skilled in the art that yet other modifications could be made to the provided invention without deviating from its spirit and scope as so claimed.

I claim:

1. A method of limiting jitter in a first telecommunications signal having a first frame which is being mapped into a second telecommunications signal having a second frame, said first telecommunications signal having a first payload envelope with a path overhead (POH) and a first transport overhead (TOH), said first TOH including a first pointer which points to the location of the start of the said payload envelope wherein said first pointer moves in conjunction with a stuff or destuff in said first telecommunications signal, and said second telecommunications signal having a second payload envelope and a second transport overhead, said second transport overhead including a second pointer which points to the location of the start of said second payload envelope wherein said second pointer moves in conjunction with a stuff or destuff in said second telecommunications signal, bytes of said first telecommunications signal being stored in data storage means while awaiting mapping into said second telecommunications signal, wherein stuffs or destuffs of data into said first telecommunications signal are performed based on the amount of data located in said data storage means, the method comprising:

a) at a predetermined first byte location in said first payload envelope, monitoring the amount of data located in the data storage means in order to make a determination to generate a data stuff if too little data is in said data storage means, or a data destuff if too much data is in said data storage means;

b) when a column of said first frame containing said predetermined first byte location and a first column of said first TOH are adjacent each other in said first frame, upon determining that said second pointer of said second telecommunications signal has moved in a first direction, monitoring the amount of data located in the data storage means at a second byte location in said adjacent first column of said first TOH instead of at said predetermined first byte location if a pointer movement in said first telecommunications signal which would be in a second direction which is opposite to said first direction would require said column containing said predetermined first byte location to move over said first column of said first TOH.

2. A method according to claim 1, wherein:

said predetermined first byte location is in said first POH.

3. A method according to claim 1, wherein:

said predetermined first byte location comprises a J1 byte.

4. A method according to claim 1, further comprising:

c) temporarily holding said pointer movement in said second direction in abeyance.

5. A method according to claim 4, further comprising:

d) while said pointer movement in said second direction is in held in abeyance, determining that said second pointer of said second telecommunications signal has again moved in said first direction, and monitoring the amount of data located in the data storage means at a third byte location in a second column adjacent said first column of said first TOH instead of at said second byte location in said first column of said first TOH.

6. A method according to claim 5, further comprising:

e) while said pointer movement in said second direction is in held in abeyance, determining that said second pointer Of said second telecommunications signal has moved a third time in said first direction; and f) moving the first pointer so that said predetermined byte location becomes adjacent said third byte location in said second column, and said monitoring the amount of data located in the data storage means is again accomplished at said predetermined first byte location.

7. A method according to claim 6, wherein:

said predetermined byte location is in said first POH.

8. A method according to claim 7, wherein:

said predetermined byte location comprises a J1 byte.

9. A method according to claim 1, wherein:

said first telecommunications signal is a TUG-3 signal, and said second telecommunications signal is a SONET STS-3C signal.

10. A method according to claim 5, further comprising:

while said pointer movement in said second direction is in held in abeyance, determining that said second pointer of said second telecommunications signal has moved in said second direction, and monitoring the amount of data located in the data storage means at said second byte location in said first column instead of at said third byte location in said second column of said first TOH.

11. An apparatus for mapping a first telecommunications signal having a first frame into a second telecommunications signal having a second frame, said first telecommunications signal having a first payload envelope with a path overhead (POH) and a first transport overhead (TOH), said first transport overhead including a first pointer which points to the location of the start of the said payload envelope wherein said first pointer moves in conjunction with a stuff or destuff in said first telecommunications signal, and said second telecommunications signal having a second payload envelope and a second transport overhead, said second transport overhead including a second pointer which points to the location of the start of said second payload envelop, wherein movement of said second pointer causes a stuff or destuff in said second telecommunications signal, said apparatus comprising:

a) data storage means for storing data of said first telecommunications signal awaiting mapping into said second telecommunications signal;

b) data storage fullness monitoring means coupled to said data storage means, said data storage fullness monitoring means for monitoring, generally, at a first predetermined byte location in said first payload envelope, the amount of data located in said data storage means; and c) means for determining when a column of said first frame containing said predetermined byte location and a first column of said first TOH are adjacent each other in said first frame, and for determining that said second pointer of said second telecommunications signal has moved in a first direction, said means for determining coupled to said data storage fullness monitoring means wherein, said data storage fullness monitoring means monitors the amount of data located in the data storage means at a second byte location in said adjacent first column of said first TOH instead of at said first predetermined byte location if a pointer movement in said first telecommunications signal which would be in a second direction which is opposite to said first direction would require said column containing said first predetermined byte location to move over said first column of said first TOH.

12. An apparatus according to claim 11, wherein:

said first predetermined byte location is a J1 byte in said first POH.

13. An apparatus according to claim 11, further comprising:

d) first pointer movement means for moving said first pointer and generating stuffs or destuffs of data into said first telecommunications signal, said first pointer movement means coupled to said data storage fullness monitoring means, wherein said first pointer movement means temporarily holds moving said first pointer in said second direction in abeyance when said means for determining determines that a column of said first frame containing said predetermined byte location and a first column of said first TOH are adjacent each other in said first frame, and that said second pointer of said second telecommunications signal has moved in a first direction.

14. An apparatus according to claim 13, wherein:

said data storage fullness monitoring means monitors the amount of data located in the data storage means at a third byte location in a second column adjacent said first column of said first TOH instead of at said second byte location in said first column of said first TOH when, while movement of said first pointer is held in abeyance, said second pointer of said second telecommunications signal has again moved in said first direction.

15. An apparatus according to claim 14, wherein:

said pointer movement means moves the first pointer so that said predetermined first byte location becomes adjacent said third byte location in said second column, and said data storage fullness monitoring means monitors the amount of data located in the data storage means at said predetermined first byte location when said means for determining determines, while said pointer movement in said second direction is in held in abeyance, that said second pointer of said second telecommunications signal has moved a third time in said first direction.

16. An apparatus according to claim 15, wherein:

said predetermined first byte location comprises a J1 byte in said first POH.

17. An apparatus according to claim 11, wherein:

said first telecommunications signal is a TUG-3 signal, and said second telecommunications signal is a SONET STS-3C signal.

18. An apparatus according to claim 15, wherein:

said data storage fullness monitoring means monitors the amount of data located in the data storage means at said second byte location in said first column instead of at said third byte location in said second column of said first TOH when, while said pointer movement in said second direction is in held in abeyance and said data storage fullness monitoring means monitors the amount of data at said second byte location, said means for determining has determined that said second pointer of said second telecommunications signal has moved in said second direction.

* * * * *